United States Patent [19]

Imanari et al.

[11] Patent Number: 5,657,173

[45] Date of Patent: Aug. 12, 1997

[54] WORKING FORCE QUANTITY IMPARTING MEMBER, WORKING FORCE QUANTITY IMPARTING STRUCTURE AND LENS BARREL

[75] Inventors: Hitoshi Imanari, Yokohama; Osamu Nitoube, Tokyo, both of Japan

[73] Assignee: Nikon Corporation, Tokyo, Japan

[21] Appl. No.: 582,174

[22] Filed: Jan. 2, 1996

[30] Foreign Application Priority Data

Apr. 14, 1995 [JP] Japan .................... 7-089257

[51] Int. Cl.⁶ .................................... G02B 07/02
[52] U.S. Cl. ........................... 359/825; 359/826
[58] Field of Search .................. 359/825, 826, 359/694, 703, 704

[56] References Cited

U.S. PATENT DOCUMENTS

| | | | |
|---|---|---|---|
| 4,269,479 | 5/1981 | Hamatani | 359/704 |
| 4,336,979 | 6/1982 | Hamatani | 359/826 |
| 4,416,513 | 11/1983 | Uesugi | 359/825 |
| 4,690,519 | 9/1987 | Clark | 359/699 |
| 5,239,417 | 8/1993 | Eguchi | 359/823 |
| 5,453,879 | 9/1995 | Ishii | 359/694 |

*Primary Examiner*—Georgia Y. Epps
*Assistant Examiner*—Ricky Mack

[57] ABSTRACT

A working force quantity imparting member disposed between a fixed member and an operation member moving relative to the fixed member imparts a working force quantity to the operation member. This working force imparting member includes an elastic portion, fixed to one of the fixed member and the operation member, for biasing both of the fixed member and the operation member in such directions to get away from each other and a thin-film portion formed on a surface, contiguous to the other member, of the elastic portion and exhibiting a high slidableness.

9 Claims, 3 Drawing Sheets

WORKING FORCE QUANTITY IMPARTING MEMBER, WORKING FORCE QUANTITY IMPARTING STRUCTURE AND LENS BARREL

BACKGROUND OF THE INVENTION

1. Field of the Invention

The present invention relates to a working force quantity imparting member for imparting a working force quantity to an operation member, a working force quantity imparting structure using this working force quantity imparting member and a lens barrel to which an adequate working force quantity of an external operation ring is imparted.

2. Related Background Art

In this kind of lens barrel, there has hitherto been proposed a structure for reducing a sense of any play or shake by securing a working force quantity of an external operation ring. For example, Japanese Utility Model Publication No. 3-42409 discloses a structure in which a member elastically deformable in circumferential and radial directions is disposed between slide drums, thereby obtaining the working force quantity and a good touch of operation with less play or shake.

According to the prior art described above, however, it is, as a matter of fact, quite difficult to provide the member disposed between the slide drums with a proper elastic force and a good slidableness with a low frictional coefficient at a high level.

Particularly with respect to an durability, an abrasion between that member and the slide drum is easily caused. A method of supplying an oil may be considered for reducing this abrasion, however, there arises another problem in which to cause variations in terms of working load due to temperature changes and a permeation-leakage of the oil.

SUMMARY OF THE INVENTION

It is a primary object of the present invention to provide a working force quantity imparting member, a working force quantity imparting structure and a lens barrel that are capable of obtaining both of a proper elastic force and a slidableness with a low frictional coefficient and transferring a favorable condition of working to an operation member.

To accomplish the above object, according to one aspect of the present invention, a working force quantity imparting member, disposed between a fixed member and an operation member moving relatively to the fixed member, for imparting a working force quantity to the operation member. The working force quantity imparting member comprises an elastic portion, fixed to one of the fixed member and the operation member, for biasing both of the fixed member and the operation member in such directions to get away from each other. The working force quantity imparting member further comprises a thin-film portion formed on a surface, contiguous to the other member, of the elastic portion and exhibiting a high slidableness.

Further, in the above working force quantity imparting member, the thin-film portion covers a part of or the whole of the surface, contiguous to the other member, of the elastic portion and also at least edge areas of surfaces Connected to the above surface.

According to another aspect of the present invention, a working force quantity imparting structure comprises a fixed member, an operation member moving relatively to the fixed member and the working force quantity imparting member. In the working force quantity imparting structure, the working force quantity imparting member is inserted in a recessed portion formed in one member.

Further, according to still another aspect of the present invention, a lens barrel for performing a zooming or focusing operation by moving a lens unit in an optical-axis direction comprises the working force quantity imparting structure, wherein the operation member is an external operation ring for driving a member for effecting movement control of the lens unit, and the fixed member is a member engaging with the external operation ring.

According to the present invention, the working force quantity imparting member having the elastic portion and the thin-film portion is disposed between the fixed member and the operation member, and hence the fixed member and the operation member are biased by an elastic force of the elastic portion in such directions as to get away from each other. Even if a fitting play is somewhat produced in each member, a sense of any play or shake is cleared away. In addition, the durability can be enhanced by a high slidableness of the thin-film portion, and a favorable working force quantity is imparted.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

The present invention will hereinafter be discussed in greater detail by way of embodiments with reference to the accompanying drawings.

Figure 1:
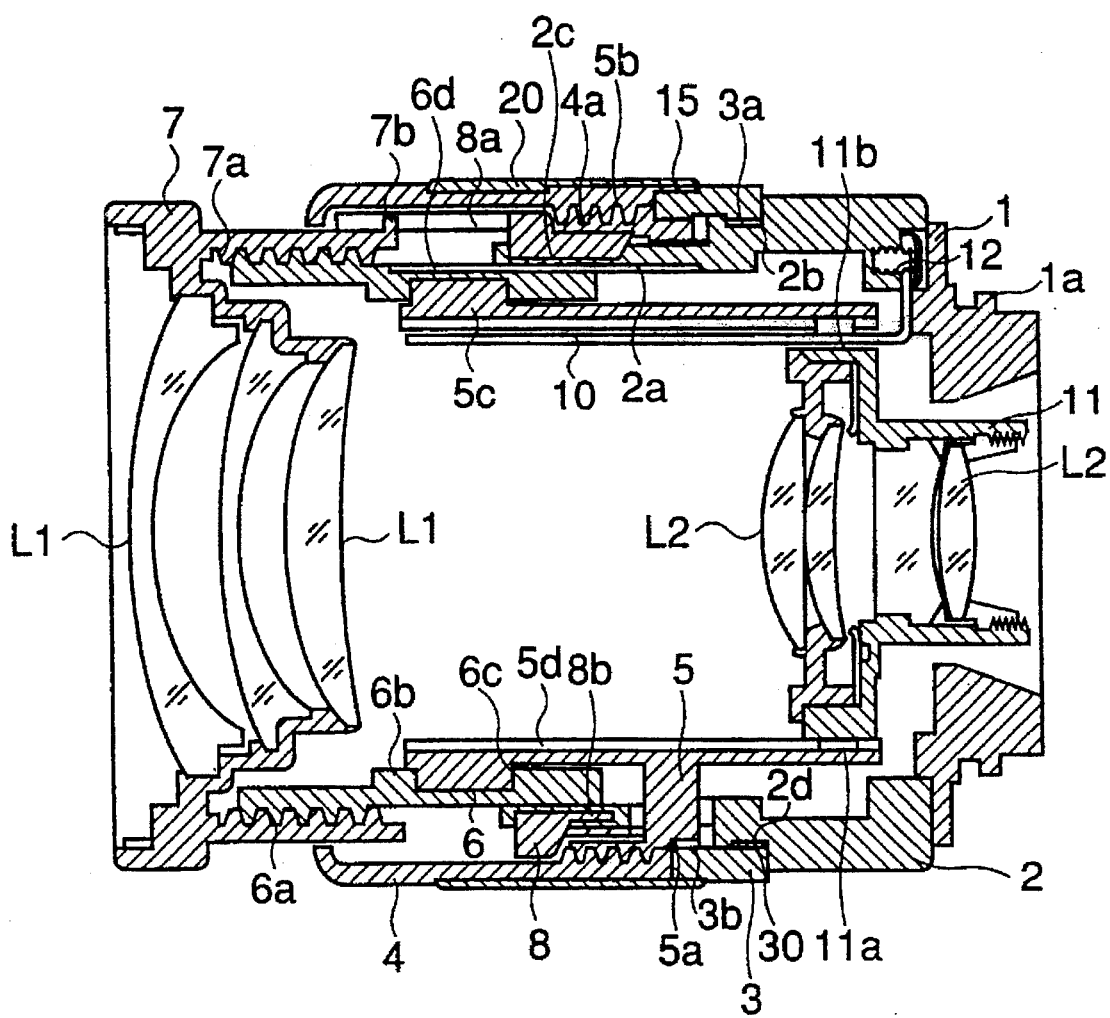
FIG. 1 is a sectional view illustrating an embodiment of a lens barrel according to the present invention.

FIG. 1 is a sectional view illustrating an embodiment of a lens barrel according to the present invention.

A fixed mount 1 is conceived as a male mount fitted into a female mount (unillustrated) on the side of a camera. This fixed mount 1 is formed with a bayonet member 1a.

A fixed portion 2 is a fixed portion provided integrally with the fixed mount 1. The fixed portion 2 is formed with three rectilinear key parts 2a protruded from an inside-diametrical portion, a guide groove 2b formed in an outside-diametrical portion about the optical axis and serving as an angular groove for covering a zooming range and a guide groove 2c formed in a front edge of the outside-diametrical portion.

A zoom ring 3 is a ring rotated about the optical axis to perform zooming and is provided with three pins 3a protruding toward the inside diameter. The pin 3a engages with the guide groove 2b. Further, a rectilinear key part 3b is so provided as to protrude toward the inside diameter of a front edge of the zoom ring 3.

An adjustment member 4 is a member, for adjusting an infinity position, fixed to the zoom ring 3 with an adhesive tape 15 so that the adjustment member 4 is rotatable together with the zoom ring 3 after making an assembly adjustment. A female helicoid screw 4a is formed in an inside-diametrical portion.

A cam drum 5 is formed with a rectilinear guide groove 5a formed in a rightward outer portion, a male helicoid screw 5b provided on an outside-diametrical portion, a cam protrusion 5c provided on a leftward outer peripheral portion and a concave cam groove 5d, formed in an inside-diametrical portion, for controlling a movement of a second lens unit L2.

A male helicoid member 6 is a member formed with a helicoid screw 6a on an outside-diametrical leftward portion, cam followers 6b, 6c on an inside-diametrical portion and a rectilinear guide groove 6d in an outside-diametrical rightward portion.

A holding frame 7 is a frame for holding a first lens unit L1 and is formed with a female helicoid screw 7a in an inside-diametrical portion so as to mesh with the helicoid screw 6a. The holding frame 7 is provided with an engagement key part 7b on an outside-diametrical rightward portion.

A drive ring 8 is a ring rotated about the optical axis by an unillustrated drive gear and having a key part 8a extending together with the drive ring 8 in the optical-axis direction and engaging with a key part 7b of the holding frame 7 and also a drive gear 8b formed on an inside-diametrical portion.

A rectilinear interlocking key 10 is a key positioned and fixed to the fixed portion 2 with a screw 12. A holding member 11 serves to hold the second lens unit L2 and is formed with an interlocking protrusion 11a engaging with the cam groove 5d and a guide groove 11b engaging with the rectilinear interlocking key 10.

Adhesive tape 15 serves to fix the adjustment member 4 to the zoom ring 3 after an adjustment has been made. A rubber ring 20 is covered on the zoom ring 3 and the adjustment member 4 after being fixed by the adhesive tape 15.

Figure 2:
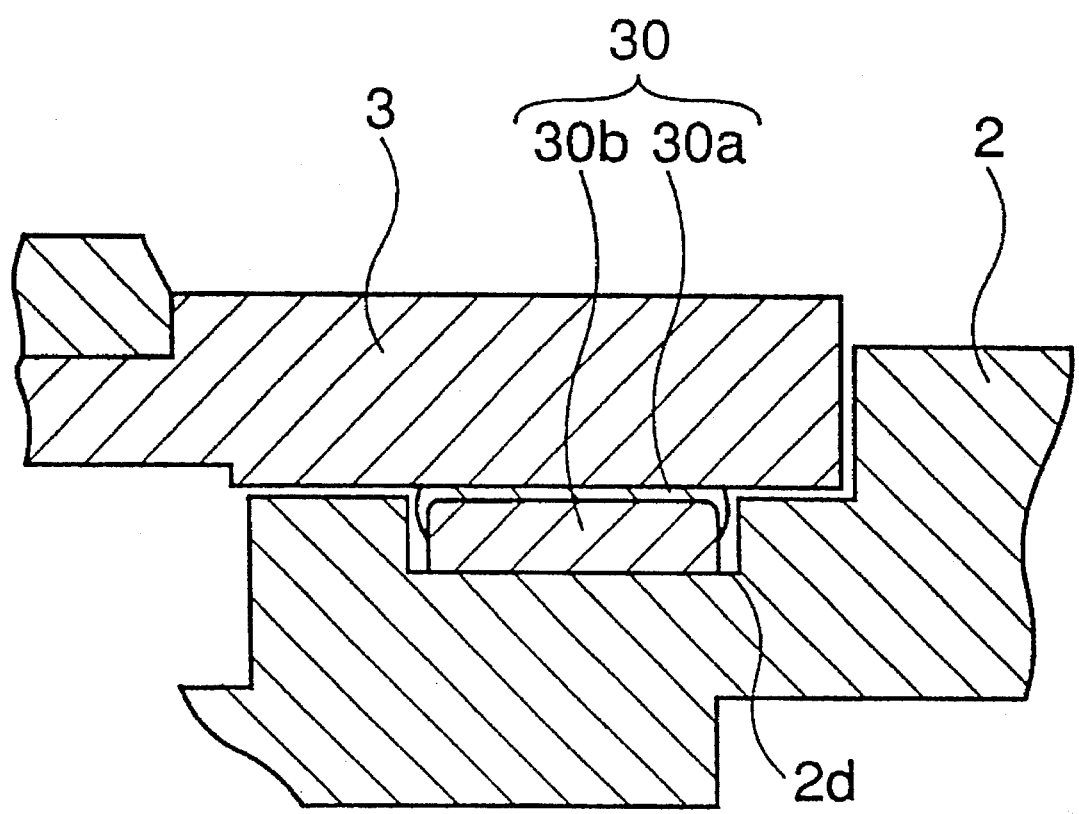
FIG. 2 is an enlarged view illustrating the principal portion of this embodiment.
Figure 3:
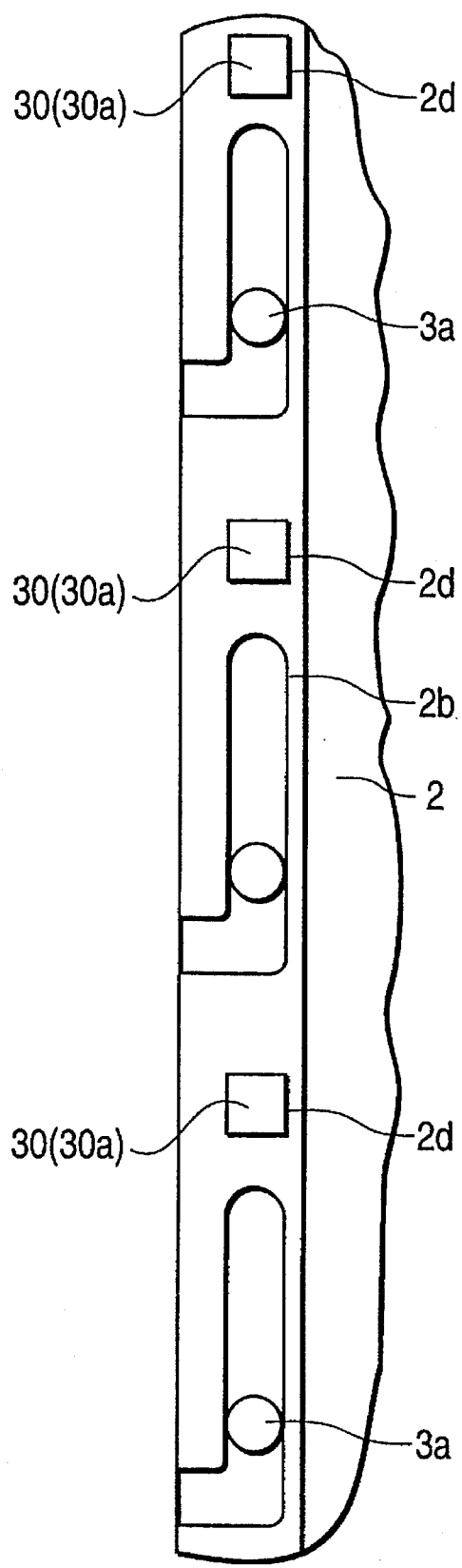
FIG. 3 is a development illustrating this embodiment.

FIGS. 2 and 3 are an enlarged view and a development illustrating the principal portion of the lens barrel in the embodiment of the present invention.

The guide groove 2b is formed along the optical axis and is an angular groove for covering the zooming range. The three pins 3a protruding toward the inside diameter of the zoom ring 3 are engaged with this guide groove 2b.

Three recessed portions 2d are formed in an area defined by the guide groove 2b in a circumferential direction, and the working force quantity imparting member 30 is inserted in this recessed portion 2d.

The working force quantity imparting member 30 is constructed of an elastic portion 30b and a thin-film portion 30a. The elastic portion 30b is a portion for biasing the fixed portion (fixed member) 2 and the zoom ring (operation member) 3 in such directions as to get away from each other and is inserted in the recessed portion 2d of the fixed portion 2.

The thin-film portion 30a is a sheet-like portion formed on a surface, contiguous to the zoom ring 3 (on the side with no recessed portion), of the elastic portion 30b and exhibiting a high slidableness. The thin-film portion 30a is closely stuck to the elastic portion 30b so as to cover even upper edges of the side surfaces thereof.

A material exhibiting a high durability is preferably used for the thin-film portion 30a.

High-elasticity moldable rubbers such as silicon rubber, EPR (Ethylene Propylene Rubber) and chloroprene rubber are preferably employed for the elastic portion 30b. If a thickness of the elastic portion 30b and a depth of the groove 2d are varied, the working force quantity imparting member 30 is capable of adjusting a force quantity enough to push the zoom ring 3 and the fixed portion 2 against each other.

As illustrated in FIG. 2, if the thin-film portion 30a is structured to embrace the elastic portion 30b, the thin-film portion 30a is not peeled off at all. Further, this structure is easily obtained by closely sticking a thin sheet of Teflon over to one surface of the silicon rubber and emboss-cutting it from the Teflon side.

Based on the structure described above, when rotating the zoom ring 3 about the optical axis, the adjustment member 4 and the cam drum 5 that are fixed integrally with the zoom ring 3 are rotated about the optical axis.

At this time, the working force quantity imparting member 30 is inserted in between the zoom ring 3 and the fixed portion 2, and, therefore, an adequate sense of operation is obtained owing to the elasticity of the elastic portion 30b. Further, the durability is enhanced by the high slidableness of the thin-film portion 30a.

As a result, the cam protrusion 5c rotates about the optical axis, and hence the male helicoid member 6 moves back and forth in the optical-axis direction by action of the rectilinear groove 6d engaged with the rectilinear key 2a of the fixed portion 2 as well as by action of the cam followers 6b, 6c engaging with the cam protrusion 5c so that the cam protrusion 5c is interposed therebetween.

It also follows that the holding frame 7 of the first lens unit L1, which makes a screw-engagement with the male helicoid member 6, moves together for zooming in the optical-axis direction.

On the other hand, when the cam drum 5 is rotated by action of the guide groove 11b engaging with the rectilinear interlocking key 10 as well as by action of the interlocking protrusion 11a of the second lens unit holding frame 11 engaging with the inside-diametrical cam groove 5d of the cam drum 5, the second lens unit L2 moves for zooming in the optical-axis direction.

The first lens unit L1 serving also as a focusing lens unit performs, when the holding frame 7 is rotated, focusing with its movement in the optical-axis direction by drive action of the helicoid screws 7a, 6a. Further, the engagement key part 7b rotationally interlocks with the interlocking key part 8a of the drive ring 8, and therefore, when the focusing is carried out, the drive ring 8 is rotated. The drive ring 8 is restricted so as to permit only its rotation about the optical axis with the aid of the guide groove 2c of the fixed portion 2. When driven for autofocusing (AF) by a motor in combination with the gear, the drive ring 8 is rotated about the optical axis by the gear 8b formed on the drive ring 8 and an unillustrated drive gear.

The present invention is not limited to the embodiments discussed above but may be modified and changed in a variety of forms, and those modifications and changes fall within the equal scope of the present invention.

For example, the working force quantity imparting member 30 may be, though explained by way of the example where the member 30 is mounted on the side of the fixed portion, mounted on the side of the operation member. The working force quantity imparting members 30 may be, though provided at the three places, provided at four or more places. The working force quantity imparting member 30 may be, though explained by way of the example where the member 30 is inserted in the recessed portion 3d, fixed onto a flat surface by bonding or otherwise.

The working force quantity imparting member 30 may be, though explained by way of the example of being mounted in the lens barrel, incorporated into other devices if the member 30 is manually operated.

As discussed above in greater detail, according to the present invention, the elastic portion biases the operation member and the fixed member in such directions to get away from each other (to push against each other), and therefore a sense of any play or shake is cleared away.

Further, the durability enhances owing to the thin-film portion exhibiting the high slidableness, and this eliminates the necessity for supplying the sliding portion with oil or the like. Accordingly, there arises no such problem that a remarkable change in the working force quantity is caused due to variations in temperature or the oil permeates and leaks.

What is claimed is:

1. A working force quantity imparting member, disposed between a fixed member and an operation member moving relatively to said fixed member, for imparting a working force quantity to said operation member, said imparting member comprising:

an elastic portion, fixed to one of said fixed member and said operation member, for biasing both of said fixed member and said operation member in such directions to get away from each other; and a film portion formed on a surface, contiguous to one of said operation member and said fixed member, respectively, of said elastic portion and exhibiting slidableness.

2. The working force quantity imparting member according to claim 1, wherein said film portion covers a part of or the whole of said surface, contiguous to said other member, of said elastic portion and also at least edge areas of surfaces connected to said surface.

3. A working force quantity imparting structure comprising:

a fixed member;

an operation member moving relatively to said fixed member; and a working force quantity imparting member disposed between a fixed member and an operation member moving relatively to said fixed member, for imparting a working force quantity to said operation member, said imparting member including:

an elastic portion, fixed to one of said fixed member and said operation member for biasing both of said fixed member and said operation member in such directions to get away from each other; and a film portion formed on a surface, contiguous to one of said operation member and said fixed member, respectively, of said elastic portion and exhibiting slidableness.

4. The working force quantity imparting structure according to claim 3, wherein said working force quantity imparting member is inserted in a recessed portion formed in said one member.

5. A lens barrel for performing a zooming or focusing operation by moving a lens unit in an optical-axis direction, comprising:

a working force quantity imparting structure including
a fixed member;
an operation member moving relatively to said fixed member; and
a working force quantity imparting member disposed between a fixed member and an operation member moving relatively to said fixed member, for imparting a working force quantity to said operation member, said imparting member comprising:

an elastic portion, fixed to one of said fixed member and said operation member, for biasing both of said fixed member and said operation member in such directions to get away from each other; and a film portion formed on a surface, contiguous to one of said operation member and said fixed member, respectively, of said elastic portion and exhibiting slidableness, wherein said operation member is an external operation ring for driving a member for effecting movement control of aid lens unit, and said fixed member is a member engaging with said external operation ring.

6. A lens barrel comprising:

a fixed member for holding a lens unit so as to be movable in an optical-axis direction;

an operation member surrounding said fixed member and rotatable about an optical axis to move said lens unit in the optical-axis direction;

a plurality of recessed portions disposed at intervals on an outer periphery of said fixed member;

an elastic member disposed in each of said recessed portions and exhibiting elasticity; and a lubricating member disposed on an outer surface of said elastic member and having a frictional coefficient such that no lubricants are necessary between said lubricating member and said operation member when brought into contact with an inner surface of said operation member, wherein said elastic member and said lubricating member are formed into one united body, said lubricating member extends outward in the radial direction by a predetermined distance from said recessed portion, and a sense of any play or shake in a connection between said fixed member and said operation member is thereby cleared away.

7. The lens barrel according to claim 6, wherein said elastic member includes a rubber selected from a group consisting of silicon rubber, ethylene propylene rubber and chloroprene rubber.

8. The lens barrel according to claim 6, wherein said lubricating member includes Teflon.

9. A lens barrel comprising:

a fixed member for holding a lens unit so as to be movable in an optical-axis direction;

an operation member surrounding said fixed member and rotatable about an optical axis to move said lens unit in the optical-axis direction;

an elastic member exhibiting elasticity; and a lubricating member disposed on an outer surface of said elastic member and having a frictional coefficient such that no lubricants are necessary between said lubricating member and said operation member when brought into contact with an inner surface of said operation member, wherein said elastic member and said lubricating member are formed into one united body.

* * * * *